(12) United States Patent
Tran et al.

(10) Patent No.: US 7,134,000 B2
(45) Date of Patent: Nov. 7, 2006

(54) METHODS AND APPARATUS FOR INSTRUCTION ALIGNMENT INCLUDING CURRENT INSTRUCTION POINTER LOGIC RESPONSIVE TO INSTRUCTION LENGTH INFORMATION

(75) Inventors: Thang M. Tran, Austin, TX (US);
Ravi Pratap Singh, Austin, TX (US);
Deepa Duraiswamy, Austin, TX (US);
Srikanth Kannan, Austin, TX (US)

(73) Assignee: Analog Devices, Inc., Norwood, MA (US)

(*) Notice: Subject to any disclaimer, the term of this patent is extended or adjusted under 35 U.S.C. 154(b) by 378 days.

(21) Appl. No.: 10/442,329

(22) Filed: May 21, 2003
(Under 37 CFR 1.47)

(65) Prior Publication Data

US 2004/0236926 A1 Nov. 25, 2004

(51) Int. Cl.
*G06F 9/30* (2006.01)
*G06F 9/40* (2006.01)
*G06F 15/00* (2006.01)

(52) U.S. Cl. .................................................... 712/204
(58) Field of Classification Search ................. 712/204
See application file for complete search history.

(56) References Cited

U.S. PATENT DOCUMENTS

| | | | |
|---|---|---|---|
| 5,463,748 A | 10/1995 | Schwendinger | |
| 5,668,984 A | 9/1997 | Taborn et al. | |
| 5,721,855 A * | 2/1998 | Hinton et al. | 712/218 |
| 5,832,249 A | 11/1998 | Tran et al. | |
| 5,835,967 A * | 11/1998 | McMahan | 711/213 |
| 5,845,099 A | 12/1998 | Krishnamurthy et al. | |
| 5,896,543 A | 4/1999 | Garde | |
| 5,930,508 A | 7/1999 | Faraboschi et al. | |
| 5,978,899 A * | 11/1999 | Ginosar et al. | 712/210 |
| 6,061,779 A | 5/2000 | Garde | |
| 6,141,742 A * | 10/2000 | Favor | 711/220 |
| 6,314,509 B1 | 11/2001 | Tremblay et al. | |
| 6,453,278 B1 * | 9/2002 | Favor et al. | 703/27 |
| 6,694,425 B1 | 2/2004 | Eickemeyer | |

OTHER PUBLICATIONS

Preliminary Examination Report from a corresponding Taiwan Patent Application No. 93114616 dated May 25, 2006.

* cited by examiner

*Primary Examiner*—Eddie Chan
*Assistant Examiner*—Brian Johnson
(74) *Attorney, Agent, or Firm*—Wolf, Greenfield & Sacks, P.C.

(57) ABSTRACT

An instruction alignment unit for aligning instructions in a digital processor having a pipelined architecture includes an instruction queue, a current instruction buffer and a next instruction buffer in a pipeline stage n, an aligned instruction buffer in a pipeline stage n+1, instruction fetch logic for loading instructions into the current instruction buffer from an instruction cache or from the next instruction buffer and for loading instructions into the next instruction buffer from the instruction cache or from the instruction queue, and alignment control logic responsive to instruction length information contained in the instructions for controlling transfer of instructions from the current instruction buffer and the next instruction buffer to the aligned instruction buffer. The alignment control logic includes predecoders for predecoding the instructions to provide instruction length information and pointer generation logic responsive to the instruction length information for generating a current instruction pointer for controlling transfer of instructions to the aligned instruction buffer.

24 Claims, 11 Drawing Sheets

|   | 6 | 4 | 2 | 0 |
|---|---|---|---|---|
| 400 | 12 | 11 | 10 | X |
| 402 | 13 | 13 | 13 | 12 |
| 404 | 15 | 14 | 14 | 13 |
| 406 | 19 | 18 | 17 | 16 |

*FIG. 7*

METHODS AND APPARATUS FOR INSTRUCTION ALIGNMENT INCLUDING CURRENT INSTRUCTION POINTER LOGIC RESPONSIVE TO INSTRUCTION LENGTH INFORMATION

FIELD OF THE INVENTION

This invention relates to digital processors and, more particularly, to methods and apparatus for aligning variable length instructions fetched from an instruction cache and for providing aligned instructions to an instruction decoder.

BACKGROUND OF THE INVENTION

A digital signal computer, or digital signal processor (DSP), is a special purpose computer that is designed to optimize performance for digital signal processing applications, such as, for example, Fast Fourier transforms, digital filters, image processing, signal processing in wireless systems, and speech recognition. Digital signal processor applications are typically characterized by real time operation, high interrupt rates and intensive numeric computations. In addition, digital signal processor applications tend to be intensive in memory access operations and to require the input and output of large quantities of data. Digital signal processor architectures are typically optimized for performing such computations efficiently. In addition to digital signal processor applications, DSPs are frequently required to perform microcontroller operations. Microcontroller operations involve the handling of data but typically do not require extensive computation.

Digital signal processors may utilize a pipelined architecture to achieve high performance. As known in the art, a pipelined architecture includes multiple pipeline stages, each of which performs a specified operation, such as instruction fetch, instruction decode, address generation, arithmetic operations, and the like. Program instructions advance through the pipeline stages on consecutive clock cycles, and several instructions may be in various stages of completion simultaneously.

For compactness of code, some processors support instructions with varying lengths. For example, one processor supports 16-bit instructions, 32-bit instructions and 64-bit instructions. There are no restrictions on instruction alignment with respect to memory boundaries, so that the memory can be as compact as possible. During instruction execution, instructions are typically moved from memory to an instruction cache, also having no restrictions on instruction alignment. Thus, each instruction cache line may include one or more instructions, depending on instruction length, and an instruction may straddle instruction cache lines. Instruction fetches from the instruction cache are usually aligned to the cache line. Therefore, there is a need to align instructions fetched from the instruction cache before issuing instructions to the instruction decoder. Under ideal conditions, an aligned instruction should be issued to the instruction decoder every clock cycle.

Techniques for instruction alignment are known in the prior art. However, prior art instruction alignment techniques have not provided satisfactory performance for deeply pipelined, high performance processors. Accordingly, there is a need for improved methods and apparatus for aligning variable length instructions.

SUMMARY OF THE INVENTION

According to a first aspect of the invention, an instruction alignment unit is provided for aligning instructions in a digital processor having a pipelined architecture. The instruction alignment unit comprises a current instruction buffer and a next instruction buffer in a pipeline stage n, an aligned instruction buffer in a pipeline stage n+1, instruction fetch logic for loading instructions into the current instruction buffer from a memory or from the next instruction buffer and for loading instructions into the next instruction buffer from the memory, and alignment control logic responsive to instruction length information contained in the instructions for controlling transfer of instructions from the current instruction buffer and the next instruction buffer to the aligned instruction buffer. The current instruction buffer, the next instruction buffer and the aligned instruction buffer may each include a plurality of registers for holding instruction words. Each instruction may include one or more instruction words.

An instruction queue may hold instructions fetched from the memory when the current instruction buffer and the next instruction buffer are full. The memory providing instructions to the instruction alignment unit is typically an instruction cache.

The alignment control logic may comprise predecoders for predecoding the instructions to provide instruction length information, instruction length registers for holding the predecoded instruction length information, and pointer generation logic responsive to the instruction length information for generating a current instruction pointer for controlling transfer of instructions from the current instruction buffer and, if necessary, from the next instruction buffer to the aligned instruction buffer. The predecoders may include first predecoders for predecoding the instructions from the memory and second predecoders for predecoding the instructions in the next instruction register. The alignment control logic may further comprise multiplexers for selecting outputs of the first predecoders, outputs of the second predecoders or outputs of the instruction length registers and supplying the selected instruction length information to the instruction length registers. Each instruction length register may include a valid bit for a corresponding instruction word. The predecoders and the instruction length registers may be located in pipeline stage n, and the pointer generation logic may be located in pipeline stage n+1.

The pointer generation logic may include next pointer selection logic for selecting a next instruction pointer from the instruction length registers in response to the current instruction pointer and current pointer selection logic for selecting the current instruction pointer from the next instruction pointer. The current pointer selection logic may comprise a status latch containing a status bit that is set when the low order bits of the next instruction pointer are zero and selection logic for selecting the upper order bits of the next instruction pointer as the current instruction pointer when the status bit is set. The pointer generation logic may further comprise new pointer selection logic for selecting a new pointer as the current instruction pointer in response to a branch instruction.

The pointer generation logic may utilize logic circuitry wherein each value in a set of values is represented by one bit for controlling selection of the next instruction pointer and the current instruction pointer. The pointer generation logic may further utilize logic circuitry wherein each value in a set of values is represented by one bit for controlling transfer of instructions from the current instruction buffer and the next instruction buffer to the aligned instruction buffer.

According to another aspect of the invention, a method is provided for aligning instructions in a digital processor having a pipelined architecture. The method comprises loading instructions into a current instruction buffer from a memory or from a next instruction buffer, loading instructions into the next instruction buffer from the memory when the current instruction buffer is full, and controlling transfer of instructions from the current instruction buffer and the next instruction buffer to an aligned instruction buffer in response to instruction length information contained in the instructions.

According to a further aspect of the invention, alignment control logic is provided in an instruction alignment unit for aligning instructions in a digital processor having a pipelined architecture. The instruction alignment unit includes a current instruction buffer, a next instruction buffer and an aligned instruction buffer. The alignment control logic comprises, in a first pipeline stage, predecoders for predecoding the instructions to provide instruction length information and instruction length registers for the holding the predecoded instruction length information, and, in a second pipeline stage, pointer generation logic responsive to the instruction length information for generating a current instruction pointer for controlling loading of instructions from the current instruction buffer and, if necessary, from the next instruction buffer to the aligned instruction buffer.

According to a further aspect of the invention, an instruction alignment system is provided for aligning instructions in a digital processor having a pipelined architecture. The instruction alignment system comprises an instruction queue, a current instruction buffer and a next instruction buffer in a pipeline stage n, an aligned instruction buffer in a pipeline stage n+1, instruction fetch logic for loading instructions into the current instruction buffer from an instruction cache or from the next instruction buffer and for loading instructions into the next instruction buffer from the instruction cache or from the instruction queue, and alignment control logic responsive to instruction length information contained in the instructions for controlling transfer of instructions from the current instruction buffer and the next instruction buffer to the aligned instruction buffer.

BRIEF DESCRIPTION OF THE DRAWINGS

For a better understanding of the present invention, reference is made to the accompanying drawings, which are incorporated herein by reference in which:

FIG. 7 is a schematic diagram that illustrates an example of four lines of the instruction cache.

DETAILED DESCRIPTION

Figure 1:
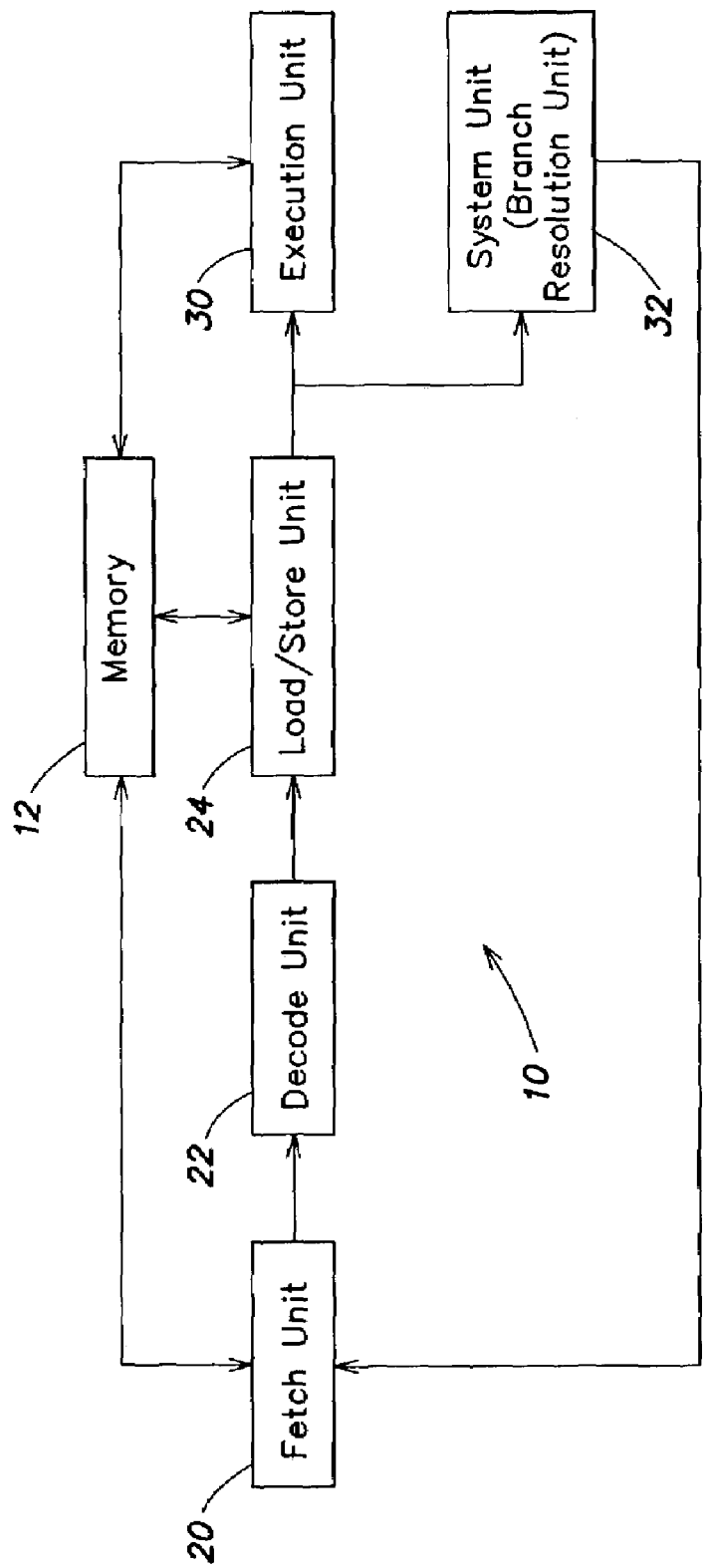
FIG. 1 is a block diagram of a digital processor having a pipelined architecture.

A block diagram of an embodiment of a digital signal processor (DSP) is shown in FIG. 1. The digital signal processor includes a computation core 10 and a memory 12. The computation core 10 is the central processor of the DSP. The core 10 and the memory 12 may have a pipelined architecture, as described below. In this embodiment, core 10 includes an instruction fetch unit 20, an instruction decode unit 22, a load/store unit 24, an execution unit 30 and a system unit 32, which may include a branch resolution unit.

The instruction fetch unit 20 and the instruction decode unit 22 are discussed below. Load/store unit 24 controls access to memory 12. Memory read data may be transferred from memory 12 to a register file in execution unit 30. Memory write data may be transferred from the register file in execution unit 30 to memory 12. The instruction fetch unit may access memory 12 in the case of an instruction cache miss in fetch unit 20. System unit 32 provides branch resolution information to instruction fetch unit 20. Execution unit 30 may include one or more adders, multipliers, accumulators, shifters, etc. as needed for instruction execution.

Figure 2:
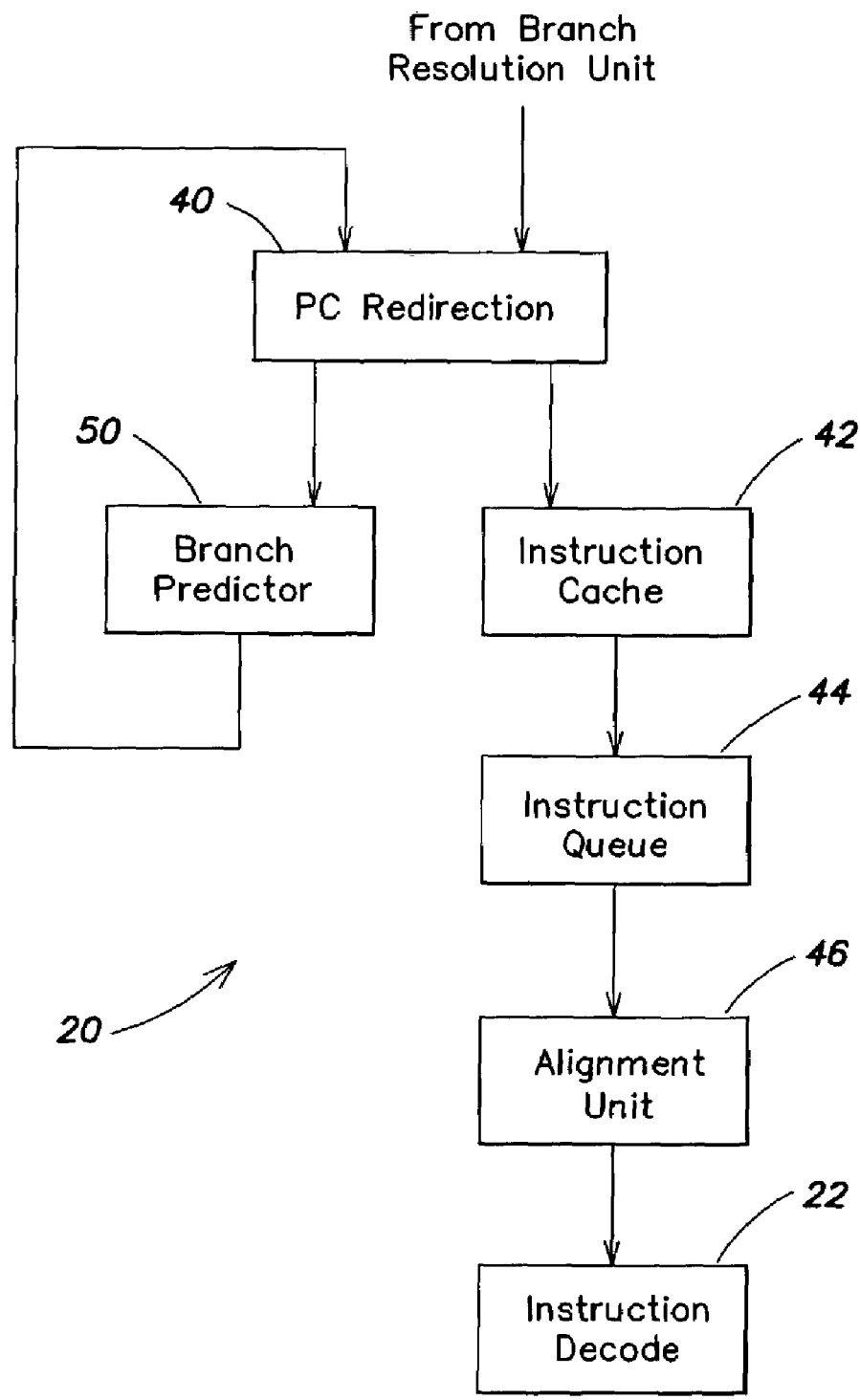
FIG. 2 is a simplified block diagram of the fetch unit and decode unit shown in FIG. 1.

A simplified block diagram of instruction fetch unit 20 and instruction decode unit 22 is shown in FIG. 2. Instruction fetch unit 20 may include a PC (program counter) redirection unit 40, an instruction cache 42, an instruction queue 44, an instruction alignment unit 46 and a branch predictor 50. The PC redirection unit 40 determines the addresses of the instructions to be fetched. Program instructions are fetched from the instruction cache 42 and are aligned by alignment unit 46. If necessary, instructions are placed in instruction queue 44 and then are supplied to alignment unit 46 as needed. The aligned instructions are decoded by instruction decoder 22, and the decoded instructions are passed to the load/store unit 24 (FIG. 1). In the event of an instruction cache miss, the requested instruction is accessed in memory 12 (FIG. 1). During normal program flow, a program counter is incremented to generate sequential instruction addresses. Branch predictor 50 predicts branch instructions and redirects instruction fetching so as to limit adverse effects of branch instructions on performance. After the branch instruction has been executed, branch resolution information is provided from system unit 32 (FIG. 1).

The computation core 10 preferably has a pipelined architecture. The pipelined architecture is a well-known architecture wherein the core includes a series of connected stages that operate synchronously, and instruction execution is divided into a series of operations performed in successive pipeline stages in successive clock cycles. Thus, for example, a first stage may perform instruction fetch, a second stage may perform instruction decoding, a third stage may perform data address generation, a fourth stage may perform data memory access and a fifth stage may perform the specified computation. An advantage of the pipelined architecture is increased operating speed, since multiple instructions may be in process simultaneously, with different instructions being in different stages of completion. It will be understood that each of the units shown in FIG. 1 may include one or more pipeline stages. By way of example only, the computation core 10 may include up to thirty stages.

The digital signal processor in this embodiment uses variable length instructions of 16 bits, 32 bits and 64 bits. The instructions are packed in memory to avoid waste of memory space. That is, the variable length instructions are packed into 64-bit lines in the instruction cache (ICache) 42. Each ICache line typically includes four 16-bit words. Thus, for example, an ICache line may include four 16-bit instructions, two 32-bit instructions, one 64-bit instruction, or a combination of different length instructions. Further, the instructions may straddle ICache lines, i.e., an instruction may be divided, on 16-bit word boundaries, between two ICache lines. Since there is no restriction on instruction order, there are many possible combinations of instruction length in an ICache line. It will be understood that the instruction lengths, the number of different instruction lengths, the number of bits in an ICache line and the word size in an ICache line are given above by way of example only and are not limiting as to the scope of the invention.

The instruction cache in this embodiment provides 64-bit lines. An instruction alignment system unpacks the instructions from the ICache lines and ideally supplies one instruction per cycle to instruction decoder 22. In some cases, it is not possible to provide one instruction per cycle to the instruction decoder. An example of such a case is a branch to a target instruction that straddles two ICache lines. Two cycles are required to fetch the complete target instruction.

Figure 3:
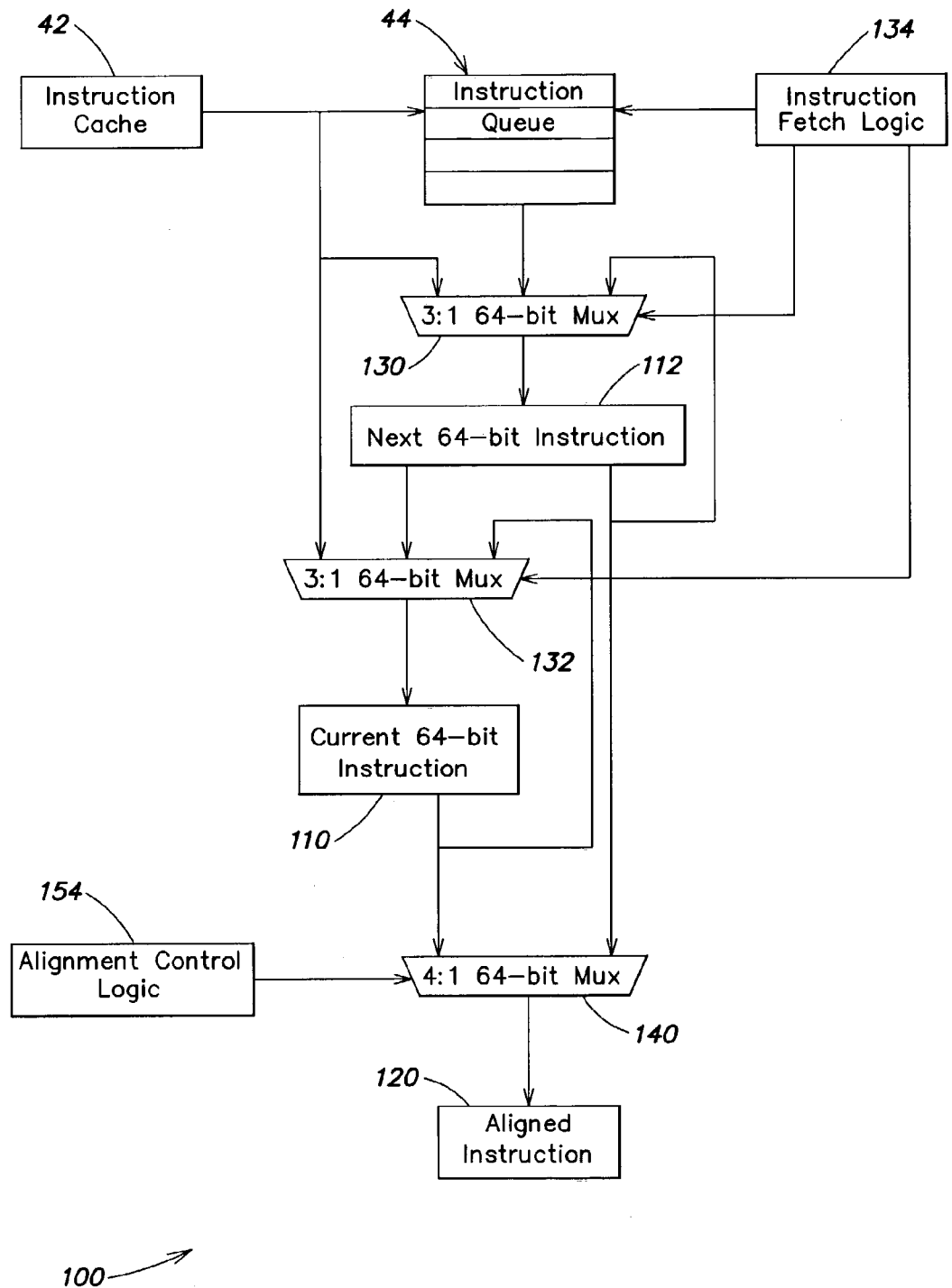
FIG. 3 is a simplified block diagram of an embodiment of an instruction alignment system in accordance with the invention.

A simplified block diagram of an instruction alignment system in accordance with an embodiment of the invention is shown in FIG. 3. An instruction alignment system 100 may include instruction queue 44 and alignment unit 46. An alignment datapath of the instruction alignment system includes instruction queue 44, a current instruction buffer 110, a next instruction buffer 112 and an aligned instruction buffer 120. In this embodiment, buffers 110, 112 and 120 each have a size of 64 bits. Instructions are supplied to next instruction buffer 112 by a 3:1 mux (multiplexer) 130, which receives inputs from instruction cache 42, from instruction queue 44 and from the output of next instruction buffer 112. Instructions are supplied to current instruction buffer 110 by a 3:1 mux 132, which receives inputs from instruction cache 42, from next instruction buffer 112 and from the output of current instruction buffer 110. Instruction fetch logic 134 controls transfer of instructions into current instruction buffer 110, next instruction buffer 112 and instruction queue 44 as described below. The outputs of buffers 110 and 112 are connected to the inputs of muxes 132 and 130, respectively, to permit the contents of the buffers to be retained for more than one clock cycle.

Figures 5A, 5B:
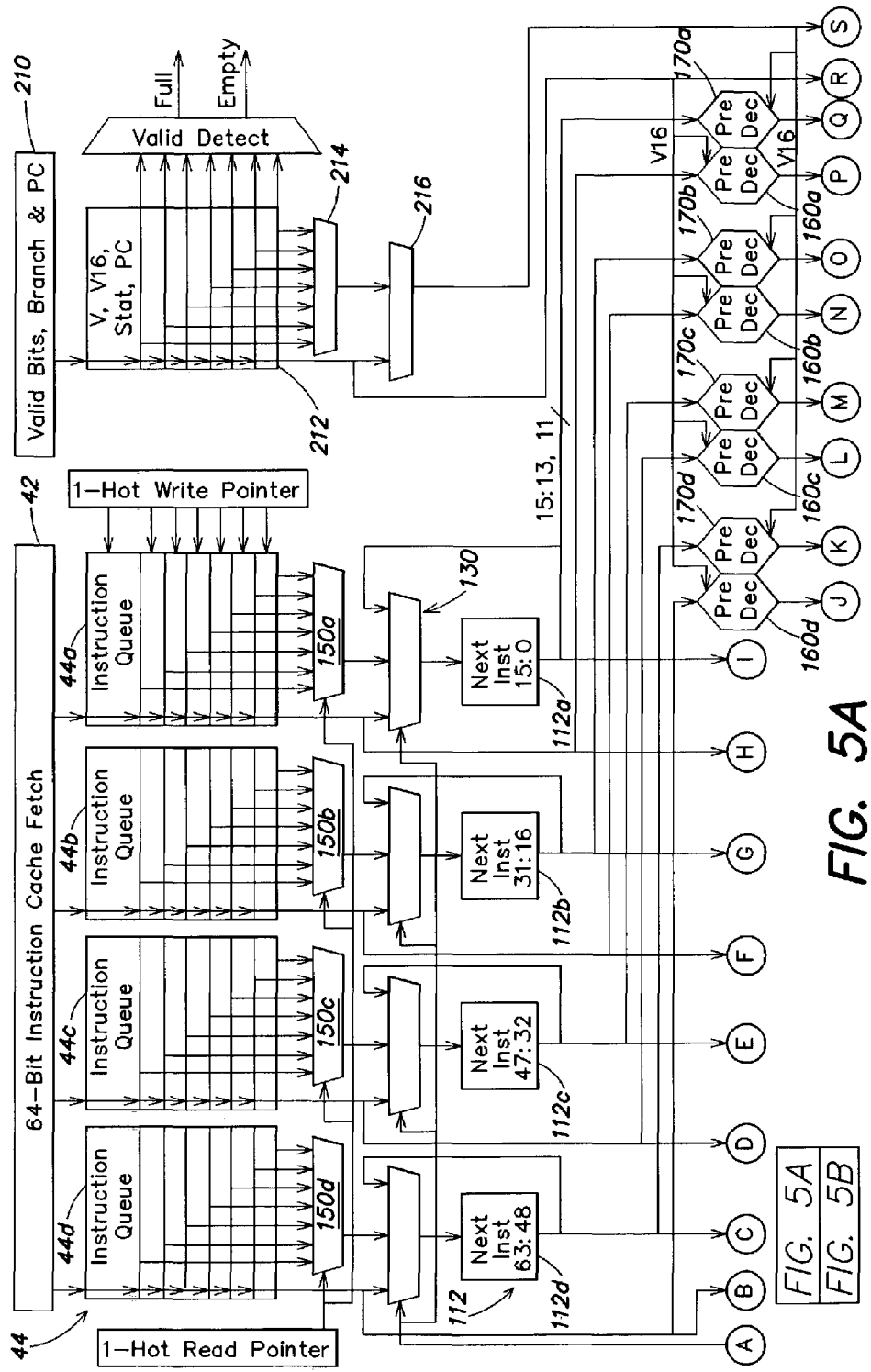
FIG. 5 is a more detailed block diagram of the instruction alignment datapath and alignment control logic.
Figure 5B:
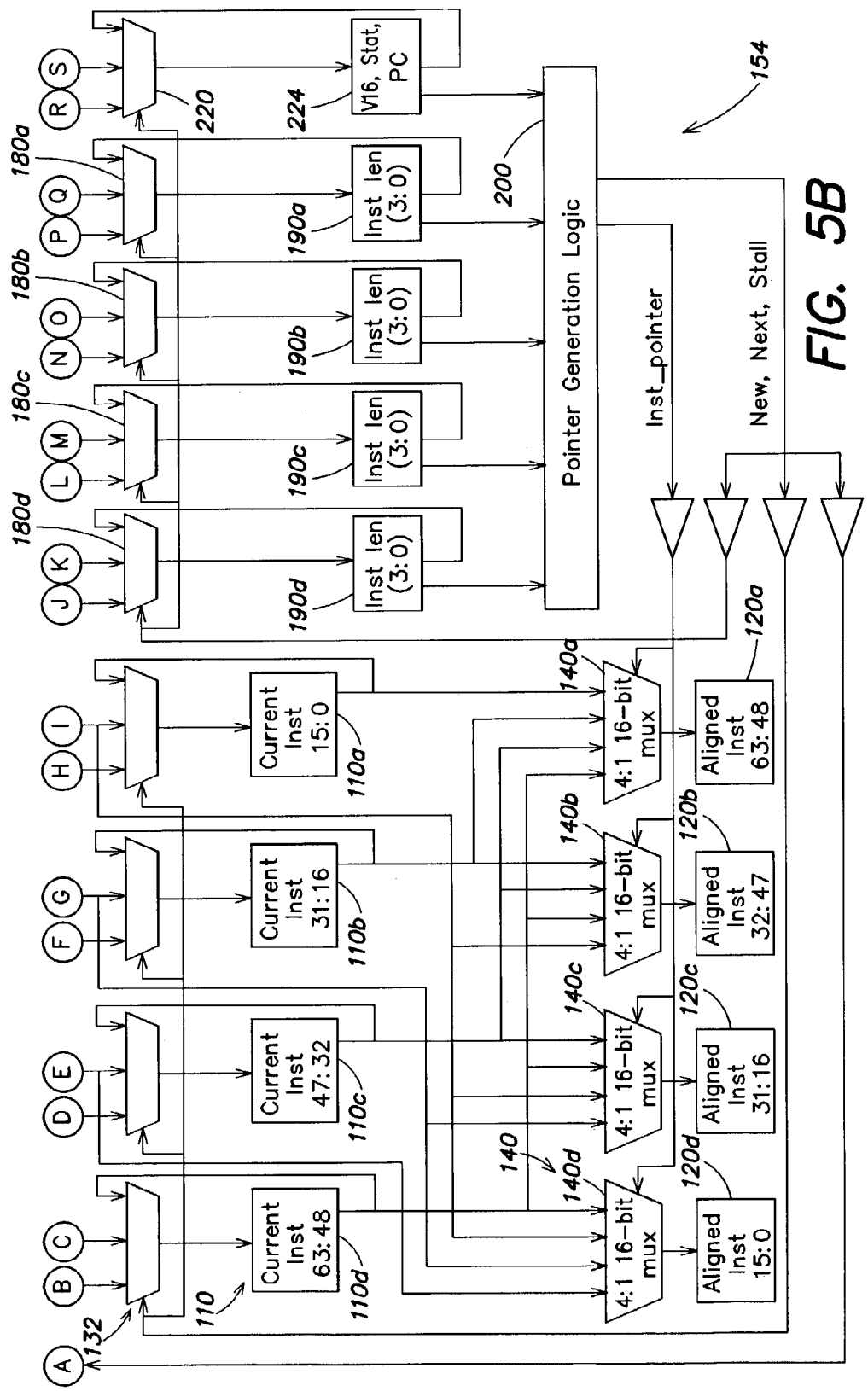

A mux 140 selects inputs from current instruction buffer 110 and, if necessary, from next instruction buffer 112 and provides an aligned instruction to aligned instruction buffer 120. In this embodiment, mux 140 is a 4:1 64-bit mux configured as shown in FIG. 5 and described below. Alignment control logic 154 controls instruction alignment as described in detail below.

The instruction alignment system is part of the pipelined architecture of the digital signal processor and in this embodiment is distributed over two pipeline stages. In the embodiment of FIGS. 2 and 3, instruction cache 42 is in stage 3, instruction queue 44, next instruction buffer 112 and current instruction buffer 110 are in stage 4, and aligned instruction buffer 120 is in stage 5 of the pipeline. The pipelined architecture permits instruction predecoding to determine instruction length information, which is used in instruction alignment as described below.

In operation, an instruction fetched from the ICache 42 is placed in current instruction buffer 110 if current instruction buffer 110 is empty. If current instruction buffer 110 is not empty and next instruction register 112 is empty, the fetched instruction is placed in next instruction buffer 112. If next instruction buffer 112 is not empty, the fetched instruction is placed in instruction queue 44. Loading of instructions into current instruction buffer 110, next instruction buffer 112 and instruction queue 44 is controlled by instruction fetch logic 134. A current instruction pointer supplied to mux 140 by alignment control logic 154 indicates the location in current instruction buffer 110 of the first 16-bit word of the instruction. Based on the pointer, mux 140 selects an instruction from current instruction buffer 110 and, if necessary, from next instruction buffer 112 and supplies an instruction to aligned instruction buffer 120.

Examples of instruction alignment are now described. In a first example, consecutive 64-bit instructions are transferred from current instruction buffer 110 to aligned instruction buffer 120 on consecutive cycles, and new instructions are loaded into current instruction buffer 110 from ICache 42.

In second example, 16-bit instructions are transferred from current instruction buffer 110 to aligned instruction buffer 120 on consecutive cycles, and newly-fetched instructions are loaded into next instruction buffer 112 and instruction queue 44 until the 16-bit instructions in current instruction buffer 110 have been used.

In a third example, a 32-bit instruction is followed by a 64-bit instruction. The 32-bit instruction and half of the 64-bit instruction are held in current instruction buffer 110, and the second half of the 64-bit instruction is held in next instruction buffer 112. On a first clock cycle, the 32-bit instruction is transferred from current instruction buffer 110 to aligned instruction buffer 120, and the contents of current instruction buffer 110 are reloaded into current instruction buffer 110. On a second clock cycle, two 16-bit words of the 64-bit instruction are selected from current instruction buffer 110, and two 16-bit words of the 64-bit instruction are selected from next instruction buffer 112. The four 16-bit words of the 64-bit instruction are loaded into aligned instruction buffer 120. In this case, the current instruction pointer supplied to mux 140 points to the third 16-bit word in current instruction buffer 110.

Different combinations of instruction lengths are possible in current instruction buffer 110 and next instruction buffer 112. In each case, the pointer supplied to mux 140 indicates the location of the first 16-bit word of the current instruction in current instruction buffer 110.

Figure 4:
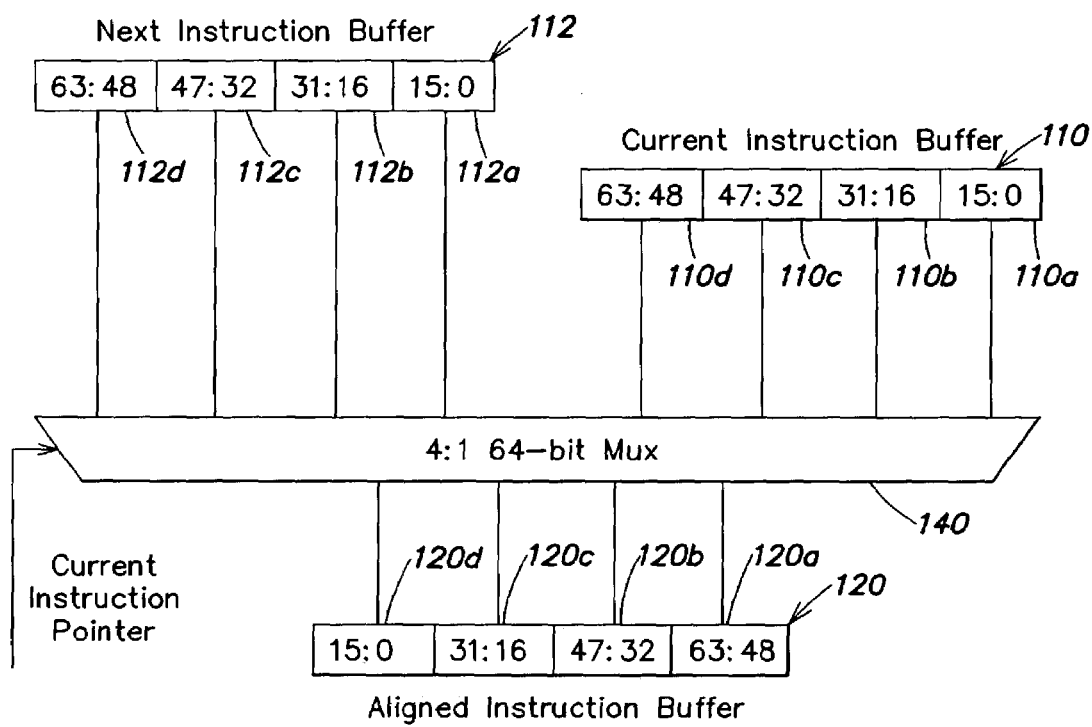
FIG. 4 is a more detailed block diagram of the datapath of the instruction alignment unit.

The datapath of the instruction alignment system is shown schematically in FIG. 4. Current instruction buffer 110 may include four 16-bit registers 110*a*, 110*b*, 110*c* and 110*d*. Next instruction buffer 112 may include four 16-bit registers 112*a*, 112*b*, 112*c* and 112*d*. Aligned instruction buffer 120 may include four 16-bit registers 120*a*, 120*b*, 120*c* and 120*d*. Register 120*a* holds bits 63:48, register 120*b* holds bits 47:32; register 120*c* holds bits 31:16 and register 120*d* holds bits 15:0 of the aligned instruction. As noted above, mux 140 is a 4:1 64-bit mux in this embodiment. Mux 140 selects four consecutive 16-bit words from current instruction buffer 110 and next instruction buffer 112 in accordance with the current instruction pointer.

In operation, the current instruction pointer supplied to mux 140 selects one of 16-bit registers 110*a*, 110*b*, 110*c* and 110*d* as containing the first 16-bit word of the current instruction. As noted above, the instruction may have a length of 16 bits, 32 bits or 64 bits. The selected instruction is provided to aligned instruction buffer 120 with the low order 16-bit word of the instruction loaded into register 120a of aligned instruction buffer 120. Thus, a 64-bit instruction in current instruction buffer 110 is transferred from registers 110a, 110b, 110c and 110d to registers 120a, 120b, 120c and 120d, respectively, of aligned instruction buffer 120. In another example, a 16-bit instruction in register 110c of current instruction buffer 110 is transferred by mux 140 to register 120a of aligned instruction buffer 120. In a further example, a 32-bit instruction that starts at register 110b of current instruction buffer 110 is transferred from registers 110b and 110c of current instruction buffer 110 to registers 120a and 120b, respectively, of aligned instruction buffer 120. In a further example, a 64-bit instruction that starts at register 110c of current instruction buffer 110 is transferred from registers 110c and 110d of current instruction buffer 110 and registers 112a and 112b of next instruction buffer 112 to registers 120a, 120b, 120c and 120d, respectively, of aligned instruction buffer 120. The alignment unit provides to the instruction decoder an instruction which is justified to the high order bits, sometimes referred to as a "left-justified" instruction.

The instruction alignment system is shown in more detail in FIG. 5. Instruction cache (ICache) 42 provides 64-bit lines ICache to instruction queue 44, to mux 130, to mux 132 and to predecoders 160a, 160b, 160c and 160d. Each ICache line includes four 16-bit instruction words. As shown, each entry in instruction queue 44 includes four 16-bit registers 44a, 44b, 44c and 44d, and instruction queue 44 has seven entries in the example of FIG. 5. A write pointer controls writing of instructions from instruction cache 42 into instruction queue 44. The outputs of registers 44a, 44b, 44c and 44d for each entry in instruction queue 44 are supplied to respective inputs of muxes 150a, 150b, 150c and 150d. A read pointer supplied to muxes 150a, 150b, 150c and 150d controls selection of an ICache line from instruction queue 44. Mux 130, which may be configured as four 16-bit muxes, selects a 64-bit line from ICache 42, from instruction queue 44 via muxes 150a, 150b, 150c and 150d, or from the output of next instruction buffer 112. The output of mux 130 is loaded into next instruction buffer 112. Mux 132, which may be configured as four 16-bit muxes, selects a 64-bit line from ICache 42, from next instruction buffer 112 or from the output of current instruction buffer 110. The output of mux 132 is loaded into current instruction buffer 110.

Mux 140 includes muxes 140a, 140b, 140c and 140d, each having four 16-bit inputs. Mux 140a receives inputs from registers 110a, 110b, 110c and 110d of current instruction buffer 110. Mux 140b receives inputs from registers 110b, 110c and 110d of current instruction buffer 110 and from register 112a of next instruction buffer 112. Mux 140c receives inputs from registers 110c and 110d of current instruction buffer 110 and from registers 112a and 112b of next instruction buffer 112.

Mux 140d receives inputs from register 110d of current instruction buffer 110 and from registers 112a, 112b and 112c of next instruction buffer 112. Muxes 140a, 140b, 140c and 140d are controlled by the current instruction pointer. The outputs of muxes 140a, 140b, 140c and 140d are supplied to registers 120a, 120b, 120c and 120d, respectively, of packed instruction buffer 120.

The packed instructions received from ICache 42 are aligned by determining the length of each instruction and an instruction pointer which points to the first 16-bit word of each instruction. This information is derived by predecoding, in each 16-bit instruction word, bits which represent instruction length and using the predecoded instruction length information in the next pipeline stage to control instruction alignment.

Referring again to FIG. 5, alignment control logic 154 includes predecoders for determining instruction length, muxes for selecting the appropriate instruction length information, registers for holding the selected instruction length information and pointer generation logic for generating alignment pointers in response to the instruction length information. In one embodiment of the invention, instruction length information is contained in bits 15:13 and 11 of the first 16-bit word of each instruction. These instruction bits are predecoded in pipeline stage 4 to determine instruction length. The instruction length information is used in pipeline stage 5 to generate control signals in the form of instruction pointers which control instruction alignment.

The alignment control logic 154 includes predecoders 160a, 160b, 160c, 160d, 170a, 170b, 170c and 170d. As shown in FIG. 5, bits 15:13 and 11 of each 16-bit word in the 64-bit line from instruction cache 42 are supplied to predecoders 160a, 160b, 160c and 160d. Similarly, bits 15:13 and 11 of registers 112a, 112b, 112c and 112d of next instruction buffer 112 are supplied to predecoders 170a, 170b, 170c and 170d, respectively. The alignment control logic 154 further includes 3:1 muxes 180a, 180b, 180c and 180d, and instruction length registers 190a, 190b, 190c and 190d. Mux 180a receives inputs from predecoders 160a and 170a and from the output of register 190a, and supplies an instruction length to instruction length register 190a. Mux 180b receives inputs from predecoders 160b and 170b and from the output of register 190b, and supplies an instruction length to instruction length register 190b. Mux 180c receives inputs from predecoders 160c and 170c and from the output of register 190c, and supplies an instruction length to instruction length register 190c. Mux 180d receives inputs from predecoders 160d and 170d and from the output of register 190d, and supplies an instruction length to instruction length register 190d. Instruction length registers 190a, 190b, 190c and 190d supply instruction length information to pointer generation logic 200.

In this embodiment, bits 15:13 and 11 of each 16-bit word are predecoded in accordance with Table 1 below. In the present embodiment, the instruction length information is encoded in bits 15:13 and 11 of the first 16-bit word of each instruction. The predecoded outputs indicate the length of each instruction. Muxes 180a, 180b, 180c and 180d select predecoded values from ICache 42, from next instruction buffer 112 or from the outputs of instruction length registers 190a, 190b, 190c and 190d according to the source of the next instruction. The selected values are loaded into instruction length registers 190a, 190b, 190c and 190d.

TABLE 1

| Predecoding Logic | | | | | | |
|---|---|---|---|---|---|---|
| INPUT BITS | | | | OUTPUT | | |
| 15 | 14 | 13 | 11 | 64 | 32 | 16 |
| 0 | X | X | X | 0 | 0 | 1 |
| X | 0 | X | X | 0 | 0 | 1 |
| 1 | 1 | 1 | X | 0 | 1 | 0 |
| 1 | 1 | 0 | 0 | 0 | 1 | 0 |
| 1 | 1 | 0 | 1 | 1 | 0 | 0 |

The alignment control logic 154 further includes circuitry for processing control information, which may include valid bits, status bits and branch information. As shown in FIG. 5, control information is supplied from a control buffer 210 associated with ICache 42 to a register 212 in instruction queue 44 and to a first input of a 2:1 mux 216. The outputs of registers 212 of instruction queue 44 are supplied to a mux 214 which selects one of the entries in instruction queue 44 in response to the instruction queue read pointer. The output of mux 214 is supplied to a second input of mux 216. Mux 216 selects the output of control buffer 210 or the output of instruction queue 44 via mux 214. The control information from control buffer 210 also is supplied to a first input of a 3:1 mux 220 and to predecoders 160a, 160b, 160c and 160d. The output of mux 216 is supplied to a second input of mux 220 and to predecoders 170a, 170b, 170c and 170d. The output of mux 220 is supplied to a control register 224. The output of register 224 is supplied to pointer generation circuit 200 and is fed back to a third input of mux 220. The feedback path to mux 220 is used in instances where the contents of register 224 are retained for more than one clock cycle.

The control information includes a valid bit for each 16-bit word in each instruction line. These valid bits, called V16 valid bits, permit control of instruction alignment in the case of branch instructions. For example, one or more instructions that follow a taken branch instruction may be marked as invalid. In the present embodiment, four V16 valid bits are provided for each instruction line As shown in FIG. 5, the V16 valid bits from control buffer 210 are combined with the outputs of predecoders 160a, 160b, 160c and 160d, and the V16 valid bits from instruction queue 44 are combined with the outputs of predecoders 170a, 170b, 170c and 170d. The outputs of the predecoders and the V16 valid bits are supplied through muxes 180a, 180b, 180c and 180d to instruction length registers 190a, 190b, 190c and 190d, respectively.

Figure 6:
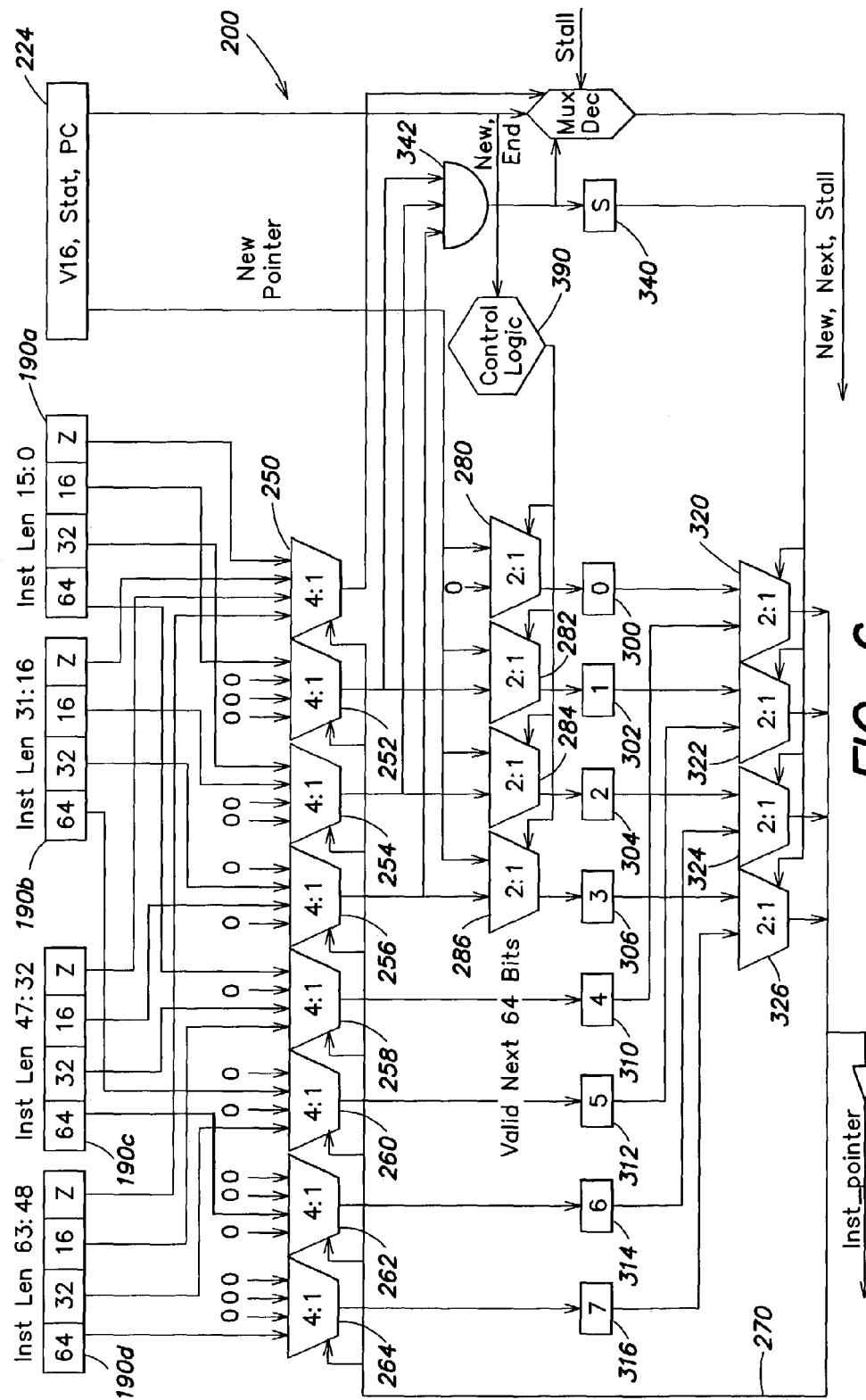
FIG. 6 is a schematic block diagram of the pointer generation logic of FIG. 5.

A schematic block diagram of an embodiment of pointer generation logic 200 is shown in FIG. 6. As shown, instruction length registers 190a, 190b, 190c and 190d include predecoded instruction length information. Each instruction length register includes one bit location for each possible value of instruction length. In the embodiment of FIG. 6, each instruction length register includes bit locations for 16-bit, 32-bit and 64-bit instructions. In addition, each instruction length register includes a Z-bit. The Z-bit is the valid bit from the V16 valid bits that corresponds to that 16-bit word. Referring to FIG. 6, the outputs of instruction length registers 190a, 190b, 190c and 190c are supplied to a set of 4:1 muxes 250, 252, 254, 256, 258, 260, 262 and 264. The muxes are shown, according to convention, with low order inputs on the right and with increasing significance from right to left. Mux 250 receives the Z-bits from instruction length registers 190a (low order input), 190b, 190c and 190d (high order input). Mux 252 receives an input from the 16-bit location in register 190a at its low order input and zeros at its other three inputs.

Mux 254 receives an input from the 32-bit location in register 190a at its low order input, an input from the 16-bit location in register 190b at its second input, and zeros at its remaining two inputs. Mux 256 receives zero at its low order input, an input from the 32-bit location in register 190b at its second input, an input from the 16-bit location in register 190c at its third input and a zero at its high order input. Mux 258 receives an input from the 64-bit location in register 190a at its low order input, a zero at its second input, an input from the 32-bit location in register 190c at its third input and an input from the 16-bit location in register 190d at its high order input. Mux 260 receives a zero at its low order input, an input from the 64-bit location in register 190b at its second input, a zero at its third input and an input from the 32-bit location in register 190d at its high order input. Mux 262 receives zeros at the first two low order inputs, an input from the 64-bit location in register 190c at its third input, and a zero at its high order input. Mux 264 receives zeros at its three low order inputs and an input from the 64-bit location in register 190d at its high order input. The outputs of muxes 250-264 are selected from their four inputs by a current instruction pointer on a bus 270 as described below.

A set of 2:1 muxes 280, 282, 284 and 286 is used to select a new pointer in the event of a branch instruction. A four-bit new pointer is supplied to first inputs of muxes 280, 282, 284 and 286. A zero is supplied to a second input of mux 280. The outputs of muxes 252, 254 and 256 are supplied to second inputs of muxes 282, 284 and 286, respectively. A select input to muxes 280, 282, 284 and 286 from control logic 390 controls selection of the outputs of muxes 252, 254 and 256 or the new pointer. The new pointer may point to the first 16-bit word of a non-sequential instruction that follows a branch instruction. The outputs of muxes 280, 282, 284 and 286 are supplied to single-bit latches 300, 302, 304 and 306, respectively. The outputs of muxes 258, 260, 262 and 264 are supplied to single-bit latches 310, 312, 314 and 316, respectively.

The outputs of latches 300–306 and 310–316 represent a next instruction pointer, Nxt_ptr. In this embodiment, the next instruction pointer has eight bits, one of which is set. The bit that is set represents the location of the first 16-bit word of the next instruction in current instruction buffer 110 or next instruction buffer 112. In the next instruction pointer, the outputs of latches 302, 304 and 306 correspond to registers 110b, 110c and 110d, respectively, of current instruction buffer 110 (FIG. 5). The lowest order bit of the next instruction pointer, which corresponds to register 110a of current instruction buffer 110, is always zero. Although register 110a may hold the current instruction, it never holds the next instruction. The output of mux 250 represents a selected valid bit. The outputs of latches 310, 312, 314 and 316 correspond to registers 112a, 112b, 112c and 112d, respectively, of next instruction buffer 112 (FIG. 5). Thus, for example, when the output of latch 304 is set to one, the first 16-bit word of the next instruction is located in register 110c of current instruction buffer 110. Similarly, when the output of latch 312 is set to one, the first 16-bit word of the next instruction is located in register 112b of next instruction buffer 112.

A set of 2:1 muxes 320, 322, 324 and 326 is used to select the current instruction pointer from the eight bits of the next instruction pointer. In particular, the outputs of latches 300, 302, 304 and 306 are supplied to first inputs of muxes 320, 322, 324 and 326, respectively. The outputs of latches 310, 312, 314 and 316 are supplied to second inputs of muxes 320, 322, 324 and 326, respectively. The outputs of muxes 320, 322, 324 and 326 represent the current instruction pointer, Cur_ptr. In this embodiment, the current instruction pointer has four bits, one of which is set. The bit that is set represents the location of the first 16-bit word of the current instruction in current instruction buffer 110. The outputs of muxes 320, 322, 324 and 326 correspond to registers 110a, 110b, 110c and 110d, respectively, in current instruction buffer 110 (FIG. 5).

Muxes 320, 322, 324 and 326 are controlled in response to a shift bit from a latch 340. Latch 340 is set by an AND gate 342. The outputs of muxes 252, 254 and 256 supply inputs to AND gate 342. The AND gate 342 detects a condition wherein the first four bits of the next instruction pointer are all zeros. This condition occurs when all the instructions in the current instruction buffer 110 have been used and the first 16-bit word of the next instruction is located in next instruction buffer 112 (FIG. 5). In this case, the shift bit is set and the current instruction pointer is taken from the outputs of latches 310, 312, 314 and 316, which correspond to the four high order bits of the next instruction pointer. On the same clock cycle, the contents of next instruction buffer 112 are transferred by instruction fetch logic 134 (FIG. 3) to current instruction buffer 110, and the next instruction line is transferred from instruction queue 44 or instruction cache 42 to next instruction buffer 110.

Deeply pipelined processors, i.e. those having a relatively large number of pipeline stages, can provide very high performance. To achieve high performance, high clock speeds are utilized, and the delay through each pipeline stage is reduced. The delay per pipeline stage is reduced by reducing the number of gates or other logic circuits connected in series in a slowest, or critical, path through the pipeline stage (for a given process technology). Thus, a pipeline stage having 20 gates per cycle indicates that the delay through 20 gates of the circuitry is less than one clock cycle at the maximum clock frequency. As clock frequencies are increased, the number of gates connected in series per pipeline stage is decreased. As a result, the processing circuitry is required to perform complex operations with a reduced number of gates connected in series.

As applied to the instruction alignment unit, alignment control logic 154 is a critical path in performing instruction alignment at high speed and in delivering one instruction per cycle to the instruction decoder 22. In one embodiment, the pipeline stages are limited to 11 gates per cycle. Thus, in pipeline stage 4 predecoders 160a–160d and 170a–170d, and muxes 180a–180d are limited to 11 gates in series. Similarly, pointer generation logic 200 in pipeline stage 5 is limited to 11 gates in series.

To achieve the required performance, alignment control logic 154 utilizes so called "one-hot" logic circuitry after predecoding of the instruction length bits of each instruction. In the one-hot logic circuitry, each value in a set of values is represented by one bit, in contrast to representing the set of values by encoded bits. Thus, for example, the current instruction pointer points to one of four registers 110a, 110b, 110c or 110d containing the first 16-bit word of an instruction and thus has four possible values. In accordance with the one-hot logic, the current instruction pointer has four bits, one of which is asserted (set to logic one in this example) to indicate the register containing the first 16-bit word of the current instruction. The four possible values of the current instruction pointer could be represented by two encoded bits, but decoding circuitry would be required and would add delay in the alignment control logic. Similarly, the pointer generation logic 200 utilizes a next instruction pointer of eight bits wherein one bit represents each of registers 110a–110b and registers 112a–112d. One bit line of the next instruction pointer is asserted to indicate the first 16-bit word of the next instruction. The one-hot logic in general may require more logic circuitry in parallel but less logic circuitry in series as compared with conventional logic circuitry that utilizes encoding. However, the one-hot logic circuitry achieves relatively low pipeline stage delay in comparison with conventional logic circuitry. Referring to FIG. 6, muxes 250–264 are controlled by one-hot current instruction pointer on bus 270. Similarly, muxes 130, 132 and 140 in FIG. 5 are controlled by one-hot instruction pointers to achieve low delay and high speed operation.

An example of instruction alignment in accordance with an embodiment of the invention is described with reference to FIGS. 7 and 8A–8E. FIG. 7 shows four instruction lines in instruction cache 42, with each ICache line including four 16-bit words. A first ICache line 400 contains 16-bit instructions I0 and I1, and a first 16-bit word of a 32-bit instruction I2. A first 16-bit word in ICache line 400 may be invalid. A second ICache line 402 immediately following ICache line 400 contains the second 16-bit word of 32-bit instruction I2 and the first three 16-bit words of a 64-bit instruction I3. A third ICache line 404 that immediately follows ICache line 402 contains a fourth 16-bit word of 64-bit instruction I3, a 32-bit instruction I4 and a 16-bit instruction I5. A fourth ICache line 406 that immediately follows ICache line 404 contains 16-bit instructions I6, I7, I8 and I9. As is apparent, 32-bit instruction I2 straddles ICache lines 400 and 402, and 64-bit instruction I3 straddles ICache lines 402 and 404. The instructions are packed in ICache 42 and require alignment before decoding.

Figure 8A:
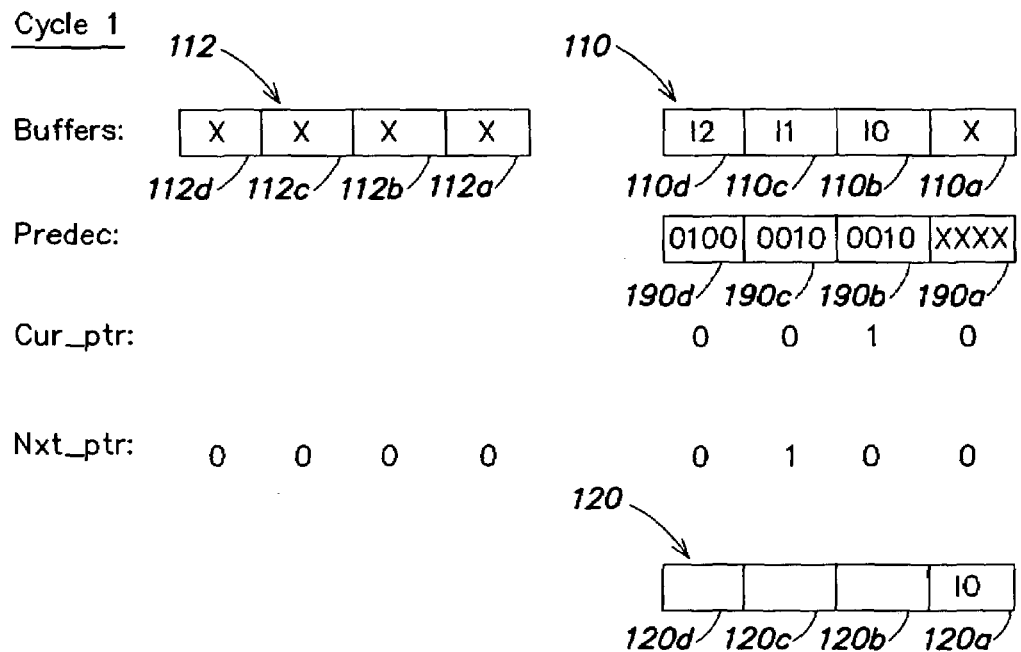
FIGS. 8A–8E illustrate operation of the pointer generation logic for five successive clock cycles in processing the instruction cache lines shown in FIG. 7.

Operation of the alignment unit in aligning ICache lines 400, 402 and 404 is shown in FIGS. 8A–8E. Referring now to FIG. 8A, the state of the alignment unit in clock cycle 1 is shown. Registers 110b, 110c and 110d of current instruction buffer 110 contain 16-bit instructions I0, I1 and the first 16-bit word of 32-bit instruction I2, respectively. Next instruction buffer 112 is empty in cycle 1. The previously predecoded instruction lengths corresponding to current instruction buffer 110 are stored in instruction length registers 190a, 190b, 190c and 190d. Instruction length registers 190b and 190c indicate 16-bit instructions, and instruction length register 190d indicates a 32-bit instruction. The current instruction pointer, Cur_ptr, points to register 110b of current instruction buffer 110 as containing the current instruction, 16-bit instruction I0, for alignment and decoding. The next instruction pointer, Nxt_ptr, points to register 110c of current instruction buffer 110 as containing the next instruction, 16-bit instruction I1, for alignment and decoding. The current instruction pointer causes the 16-bit instruction I0 in register 110b of current instruction buffer 110 to be transferred to register 120a of aligned instruction buffer 120.

Figure 8B:
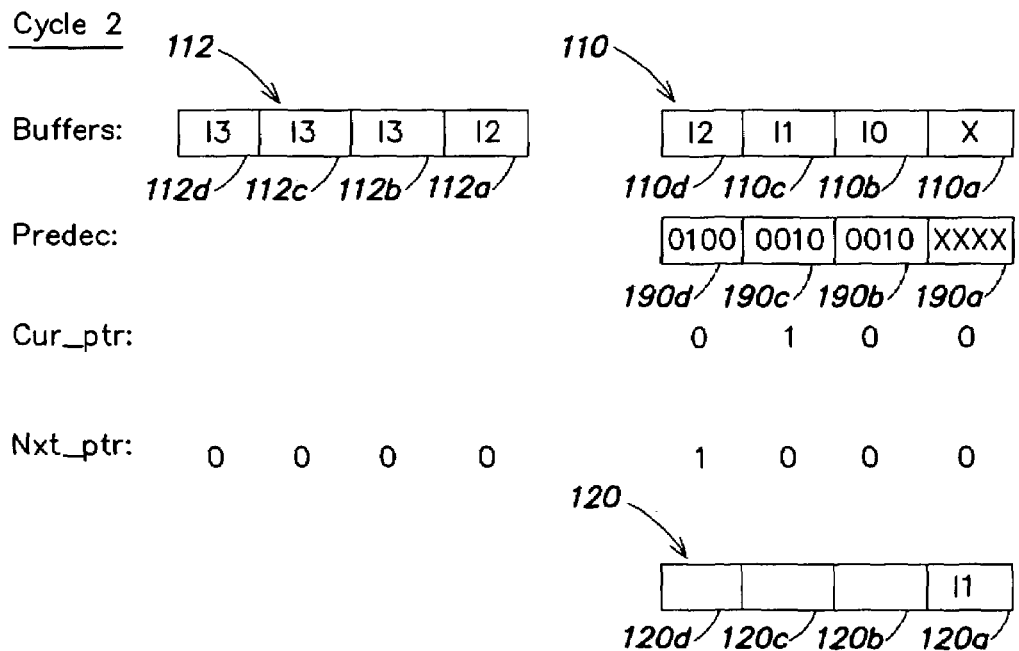

Referring to FIG. 8B, the state of the alignment unit in clock cycle 2 is shown. Current instruction buffer 110 continues to hold 16-bit instructions I0, I1 and the first 16-bit word of 32-bit instruction I2. The second 16-bit word of instruction I2 and the first three 16-bit words of 64-bit instruction I3 have been transferred into registers 112a, 112b, 112c and 112d, respectively, of next instruction buffer 112. The contents of instruction length registers 190a, 190b, 190c and 190d remain the same as in clock cycle 1 because the contents of current instruction buffer 110 remain the same. The current instruction pointer, Cur_ptr, now points to 16-bit instruction I1 in register 110c of current instruction buffer 110, and the next instruction pointer, Nxt_ptr, points to 32-bit instruction I2 in register 110d of current instruction buffer 110. The current instruction pointer causes the 16-bit instruction I1 in register 110c of current instruction buffer 110 to be transferred to register 120a of aligned instruction buffer 120.

Figure 8C:
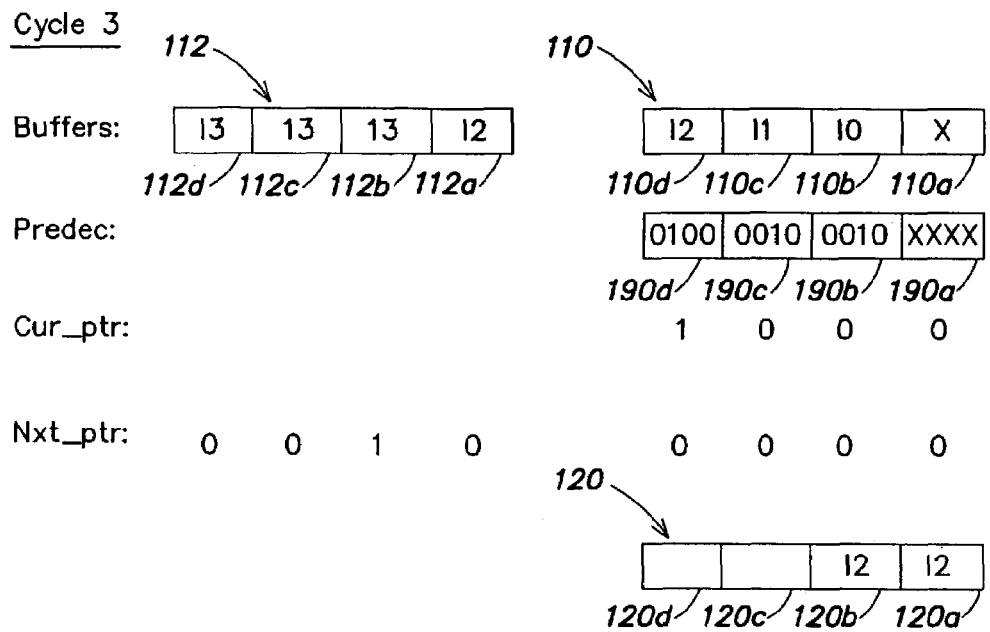

Referring now to FIG. 8C, the state of the alignment unit in clock cycle 3 is shown. Current instruction buffer 110 continues to hold 16-bit instructions I0 and I1, and the first 16-bit word of 32-bit instruction I2. Next instruction buffer 112 continues to hold the second 16-bit word of 32-bit instruction I2 and the first three 16-bit words of 64-bit instruction I3. The contents of instruction length registers 190*a*, 190*b*, 190*c* and 190*d* remain the same as in clock cycles 1 and 2. Current instruction pointer, Cur_ptr, points to register 110*d* of current instruction buffer 110, which contains the first 16-bit word of 32-bit instruction I2. Next instruction pointer, Nxt_ptr, points to register 112*b* of next instruction buffer 112, which contains the first 16-bit word of 64-bit instruction I3. The first 16-bit word of instruction I2 is transferred from register 110*d* of current instruction buffer 110 to register 120*a* of aligned instruction buffer 120, and the second 16-bit word of instruction I2 is transferred from register 112*a* of next instruction buffer 112 to register 120*b* of aligned instruction buffer 120.

In FIG. 8C, the first four bits of the next instruction pointer, Nxt_ptr, which correspond to current instruction buffer 110, are all zeros. This causes the shift latch 340 (FIG. 6) to be set, so that the four high order bits of the next instruction pointer are selected by muxes 320, 322, 324 and 326 as the current instruction pointer on the next clock cycle. In addition, the contents of the next instruction buffer 112 are transferred into the current instruction buffer 110 on the next clock cycle.

Figure 8D:
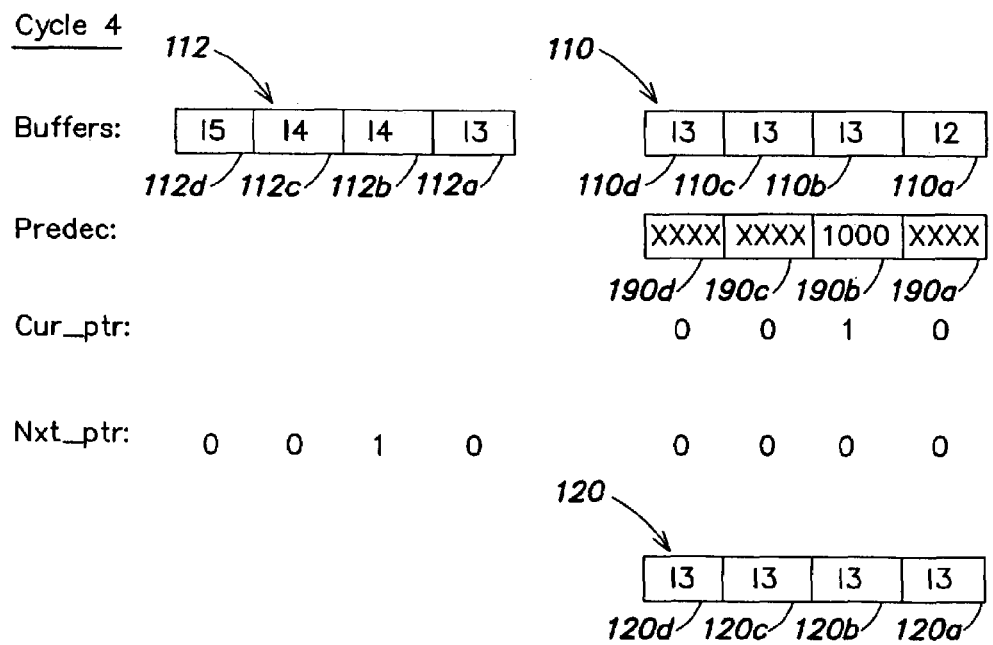

Referring now to FIG. 8D, the state of the alignment unit in clock cycle 4 is shown. ICache line 402 has been transferred from next instruction buffer 112 to current instruction buffer 110, and ICache line 404 has been transferred into next instruction buffer 112. Thus, current instruction buffer 110 contains the second 16-bit word of 32-bit instruction I2 and the first three 16-bit words of 64-bit instruction I3. Next instruction buffer 112 contains the last 16-bit word of 64-bit instruction I3, the two 16-bit words of 32-bit instruction I4 and 16-bit instruction I5. The contents of instruction length register 190*a* represent a "don't care" condition because register 110*a* contains the second 16-bit word of instruction I2. Only the first 16-bit word of each instruction contains instruction length information in this embodiment. Instruction length register 190*b* indicates a 64-bit instruction, and registers 190*c* and 190*d* represent "don't care" conditions. The current instruction pointer, Cur_ptr, points to register 110*b* of current instruction buffer 110, which contains the first 16-bit word of 64-bit instruction I3. Next instruction pointer, Nxt_ptr, points to register 112*b* of next instruction buffer 112, which contains the first 16-bit word of 32-bit instruction I4. The first three 16-bit words of instruction I3 are transferred from registers 110*b*, 110*c* and 110*d* of current instruction buffer 110 to registers 120*a*, 120*b* and 120*c*, respectively, of aligned instruction buffer 120. In addition, the fourth 16-bit word of instruction I3 is transferred from register 112*a* of next instruction buffer 112 to register 120*d* of aligned instruction buffer 120.

In FIG. 8D, the first four bits of the next instruction pointer, Nxt_ptr, again are all zeros. This causes the shift latch 340 to be set, so that the four high order bits of the next instruction pointer are selected by muxes 320, 322, 324 and 326 as the current instruction pointer on the next clock cycle. In addition, the contents of the next instruction buffer 112 are transferred into the current instruction buffer 110 on the next clock cycle.

Figure 8E:
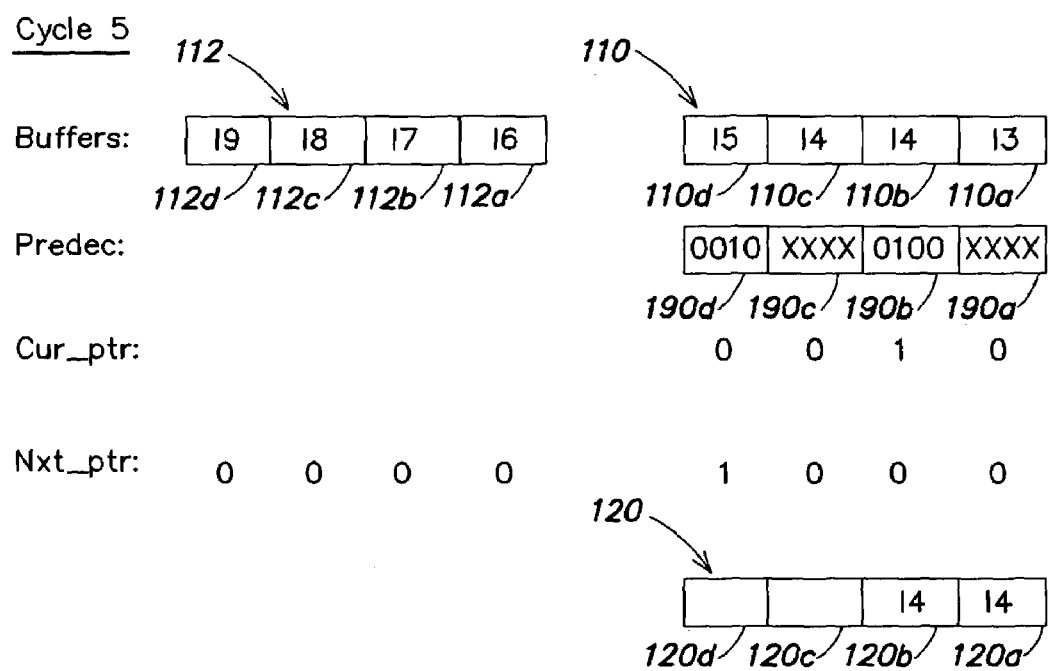

Referring now to FIG. 8E, the state of the alignment unit in clock cycle 5 is shown. ICache line 404 has been transferred from next instruction buffer 112 to current instruction buffer 110, and ICache line 406 has been transferred into next instruction buffer 112. Instruction length register 190*b* indicates a 32-bit instruction, and instruction length register 190*d* indicates a 16-bit instruction. The current instruction pointer, Cur_ptr, points to register 110*b* of current instruction buffer 110 as containing the current instruction, 32-bit instruction I4, for alignment and decoding. The next instruction pointer, Nxt_ptr, points to register 110*d* of current instruction buffer 110 as containing the next instruction, 16-bit instruction I5, for alignment and decoding. The current instruction pointer causes the 32-bit instruction I4 in registers 110*b* and 110*c* of current instruction buffer 110 to be transferred to registers 120*a* and 120*b*, respectively, of aligned instruction buffer 120.

The alignment unit continues operation in this manner, providing one instruction per cycle to the instruction decoder in the absence of a branch instruction or a stall condition.

Operation of pointer generation logic 200 shown in FIG. 6 can be understood with reference to the examples of FIGS. 8A–8E. In the example of FIG. 8A, the current instruction pointer, Cur_ptr, points to register 110*b* and corresponding instruction length register 190*b*. Accordingly, the current instruction pointer on bus 270 in FIG. 6 selects the second input of each of muxes 250–264, thereby selecting instruction length register 190*b*. Instruction length register 190*b* indicates an instruction length of 16 bits. Since the 16-bit location in instruction length register 190*b* is supplied to the second input of mux 254, mux 254 provides a logic one to the next instruction pointer. Muxes 252 and 256–264 provide logic zeros to the next instruction pointer, either because the second input to the mux is fixed at logic zero or because the selected location in instruction length register 190*b* is logic zero. As a result, the next instruction pointer, Nxt_ptr, points to register 110*c*.

In FIG. 8B the current instruction pointer, Cur_ptr, points to register 110*c* and corresponding instruction length register 190*c*. The current instruction pointer on bus 270 selects the third input of each of muxes 250–264, thereby selecting instruction length register 190*c*. Since the 16-bit location in instruction length register 190*c* is set to logic one, mux 256 provides a logic one to the next instruction pointer, and the next instruction pointer points to register 110*d*.

Referring to FIG. 8C, the current instruction pointer, Cur_ptr, points to register 110*d* and instruction length register 190*d*. In this case, instruction length register 190*d* indicates an instruction length of 32 bits. The current instruction pointer on bus 270 selects the high order input of each of muxes 250–264, thereby selecting instruction length register 190*d*. Since the 32-bit location in instruction length register 190*d* is set to logic one, mux 260 provides a logic one to the next instruction pointer, and the next instruction pointer points to register 112*b*.

Finally, referring to FIG. 8D, the current instruction pointer, Cur_ptr, points to register 110*b* and instruction length register 190*b*. In this case, instruction length register 190*b* indicates an instruction length of 64 bits. The current instruction pointer on bus 270 selects the second input of each of muxes 250–264, thereby selecting instruction length register 190*b*. Since the 64-bit location in instruction length register 190*b* is set to logic one, mux 260 provides a logic one to the next instruction pointer, and the next instruction pointer points to register 112*b*. It can be seen that muxes 252–264 utilize the instruction length information corresponding to the current instruction to determine the location of the first 16-bit word of the next instruction.

What is claimed is:

1. An instruction alignment unit for aligning instructions in a digital processor having a pipelined architecture, comprising:

a current instruction buffer and a next instruction buffer in a pipeline stage n;

an aligned instruction buffer in a pipeline stage n+1;

instruction fetch logic for loading instructions into the current instruction buffer from a memory or from the next instruction buffer and for loading instructions into the next instruction buffer from the memory; and alignment control logic responsive to instruction length information contained in the instructions for controlling transfer of instructions from the current instruction buffer and the next instruction buffer to the aligned instruction buffer, wherein the alignment control logic comprises predecoders for predecoding the instructions to provide instruction length information, instruction length registers for holding the predecoded instruction length information, one instruction length register corresponding to each register in the current instruction buffer, and pointer generation logic responsive to the instruction length information for generating a current instruction pointer for controlling transfer of instructions from the current instruction buffer and, if necessary, from the next instruction buffer to the aligned instruction buffer, wherein the pointer generation logic includes next pointer selection logic for selecting a next instruction pointer from the instruction length registers in response to the current instruction pointer, and current pointer selection logic for selecting the current instruction pointer from the next instruction pointer, wherein the current pointer selection logic comprises a status latch containing a status bit that is set when low order bits of the next instruction pointer are zero and selection logic for selecting upper order bits of the next instruction pointer as the current instruction pointer when the status bit is set.

2. An instruction alignment unit as defined in claim 1, wherein the current instruction buffer, the next instruction buffer and the aligned instruction buffer each include registers for holding a plurality of instruction words and wherein each of the instructions includes one or more instruction words.

3. An instruction alignment unit as defined in claim 1, wherein said predecoders include first predecoders for predecoding the instructions from the memory and second predecoders for predecoding the instructions in the next instruction register, said alignment control logic further comprising multiplexers for selecting outputs of the first predecoders, outputs of the second predecoders or outputs of the instruction length registers and supplying the selected instruction length information to the instruction length registers.

4. An instruction alignment unit as defined in claim 3, wherein each instruction length register includes a valid bit for a corresponding instruction word.

5. An instruction alignment unit as defined in claim 1, wherein the predecoders and the instruction length registers are located in pipeline stage n, and the pointer generation logic is located in pipeline stage n+1.

6. An instruction alignment unit as defined in claim 1, wherein the pointer generation logic further comprises new pointer selection logic for selecting a new pointer as the current instruction pointer in response to a branch instruction.

7. An instruction alignment unit as defined in claim 1, wherein the pointer generation logic utilizes logic circuitry wherein each value in a set of values is represented by one bit for controlling selection of the next instruction pointer and the current instruction pointer.

8. An instruction alignment unit as defined in claim 1, wherein the pointer generation logic utilizes logic circuitry wherein each value in a set of values is represented by one bit for controlling transfer of instructions from the current instruction buffer and the next instruction buffer to the aligned instruction buffer.

9. An instruction alignment unit as defined in claim 1, wherein an instruction queue holds instructions fetched from the memory when the current instruction buffer and the next instruction buffer are full.

10. A method for aligning instructions in a digital processor having a pipelined architecture, comprising:
    loading instructions into a current instruction buffer from a memory or from a next instruction buffer;
    loading instructions into the next instruction buffer from the memory when the current instruction buffer is full; and
    controlling transfer of instructions from the current instruction buffer and the next instruction buffer to an aligned instruction buffer in response to instruction length information contained in the instructions, wherein controlling transfer of instructions comprises predecoding the instructions to provide instruction length information and generating a current instruction pointer in response to the instruction length information for controlling transfer of instructions from the current instruction buffer and the next instruction buffer to the aligned instruction buffer, wherein generating a current instruction pointer comprises selecting a next instruction pointer from the instruction length information in response to the current instruction pointer and selecting the current instruction pointer from the next instruction pointer, wherein selecting the current instruction pointer comprises selecting upper order bits of the next instruction pointer as the current instruction pointer when low order bits of the next instruction pointer are zero.

11. A method as defined in claim 10, wherein the current instruction buffer, the next instruction buffer and the aligned instruction buffer each include registers for holding a plurality of instruction words, wherein the instructions include one or more instruction words, and wherein controlling transfer of instructions from the current instruction buffer and the next instruction buffer to the aligned instruction buffer comprises controlling transfer of instruction words from the registers of the current instruction buffer and the next instruction buffer to the registers of the aligned instruction buffer.

12. A method as defined in claim 10 wherein generating a current instruction pointer further comprises selecting a new pointer as the current instruction pointer in response to a branch instruction.

13. A method as defined in claim 10, wherein controlling transfer of instructions from the current instruction buffer and the next instruction buffer to the aligned instruction buffer comprises utilizing logic circuitry wherein each value in a set of values is represented by one bit.

14. A method as defined in claim 10, further comprising holding instructions fetched from the memory in an instruction queue when the current instruction buffer and the next instruction buffer are full.

15. In an instruction alignment unit for aligning instructions in a digital processor having a pipelined architecture, the instruction alignment unit including a current instruction buffer, a next instruction buffer and an aligned instruction buffer, alignment control logic comprising:
    in a first pipeline stage, predecoders for predecoding the instructions to provide instruction length information and instruction length registers for the holding the predecoded instruction length information; and in a second pipeline stage, pointer generation logic responsive to the instruction length information for generating a current instruction pointer for controlling transfer of instructions from the current instruction buffer and, if necessary, from the next instruction buffer to the aligned instruction buffer, wherein the pointer generation logic includes next pointer selection logic for selecting a next instruction pointer from the instruction length registers in response to the current instruction pointer, and current pointer selection logic for selecting the current instruction pointer from the next instruction pointer, wherein the current pointer selection logic comprises a status latch containing a status bit that is set when low order bits of the next instruction pointer are zero and selection logic for selecting upper order bits of the next instruction pointer as the current instruction pointer when the status bit is set.

16. Alignment control logic as defined in claim 15, wherein each of the instruction length registers includes a valid bit for a corresponding instruction word.

17. Alignment control logic as defined in claim 15, wherein the pointer generation logic further comprises new pointer selection logic for selecting a new pointer as the current instruction pointer in response to a branch instruction.

18. Alignment control logic as defined in claim 15, wherein the pointer generation logic utilizes logic circuitry wherein each value in a set of values is represented by one bit for controlling selection of the next instruction pointer and the current instruction pointer.

19. An instruction alignment system for aligning instructions in a digital processor having a pipelined architecture, comprising:
an instruction queue, a current instruction buffer and a next instruction buffer in a pipeline stage n;
an aligned instruction buffer in a pipeline stage n+1;
instruction fetch logic for loading instructions into the current instruction buffer from an instruction cache or from the next instruction buffer and for loading instructions into the next instruction buffer from the instruction cache or from the instruction queue; and
alignment control logic responsive to instruction length information contained in the instructions for controlling transfer of instructions from the current instruction buffer and the next instruction buffer to the aligned instruction buffer, wherein the alignment control logic comprises predecoders for predecoding the instructions to provide instruction length information, instruction length registers for holding the predecoded instruction length information, one instruction length register corresponding to each register in the current instruction buffer, and pointer generation logic responsive to the instruction length information for generating a current instruction pointer for controlling transfer of instructions from the current instruction buffer and, if necessary, from the next instruction buffer to the aligned instruction buffer, wherein the pointer generation logic includes next pointer selection logic for selecting the next instruction pointer from the instruction length registers in response to the current instruction pointer, and current pointer selection logic for selecting the current instruction pointer from the next instruction pointer, wherein the current pointer selection logic comprises a status latch containing a status bit that is set when low order bits of the next instruction pointer are zero and selection logic for selecting upper order bits of the next instruction pointer as the current instruction pointer when the status bit is set.

20. An instruction alignment system as defined in claim 19, wherein the current instruction buffer, the next instruction buffer and the aligned instruction buffer each include registers for holding a plurality of instruction words and wherein each of the instructions includes one or more instruction words.

21. An instruction alignment system as defined in claim 19, wherein said predecoders include first predecoders for predecoding the instructions from the instruction queue and second predecoders for predecoding the instructions in the next instruction register, said alignment control logic further comprising multiplexers for selecting outputs of the first predecoders, outputs of the second predecoders or outputs of the instruction length registers and supplying the selected instruction length information to the instruction length registers.

22. An instruction alignment system as defined in claim 19, wherein the pointer generation logic further comprises new pointer selection logic for selecting a new pointer as the current instruction pointer in response to a branch instruction.

23. An instruction alignment system as defined in claim 19, wherein the pointer generation logic utilizes logic circuitry wherein each value in a set of values is represented by one bit for controlling selection of the next instruction pointer and the current instruction pointer.

24. An instruction alignment system as defined in claim 19, wherein the pointer generation logic utilizes logic circuitry wherein each value in a set of values is represented by one bit for controlling transfer of instructions from the current instruction buffer and the next instruction buffer to the aligned instruction buffer.

* * * * *

UNITED STATES PATENT AND TRADEMARK OFFICE
CERTIFICATE OF CORRECTION

| | | |
|---|---|---|
| PATENT NO. | : 7,134,000 B2 | Page 1 of 1 |
| APPLICATION NO. | : 10/442329 | |
| DATED | : November 7, 2006 | |
| INVENTOR(S) | : Thang M. Tran et al. | |

It is certified that error appears in the above-identified patent and that said Letters Patent is hereby corrected as shown below:

In Claim 15, col. 16, line 59, "In" should be replaced by
--An alignment control logic in--;

In Claim 15, col. 16, line 63, "buffer," should be replaced by --buffer; the--.

Signed and Sealed this

Ninth Day of January, 2007

JON W. DUDAS
*Director of the United States Patent and Trademark Office*